United States Patent
Hareng et al.

[11] 4,196,974
[45] Apr. 8, 1980

[54] SMECTIC LIQUID CRYSTAL DISPLAY CELL

[75] Inventors: Michel Hareng; Serge Le Berre, both of Paris, France

[73] Assignee: Thomson-CSF, Paris, France

[21] Appl. No.: 855,697

[22] Filed: Nov. 29, 1977

[30]  Foreign Application Priority Data

Dec. 3, 1976 [FR] France ................ 76 36532

[51] Int. Cl.² ............................ G02F 1/13; C09K 3/34
[52] U.S. Cl. ..................................... 350/346; 252/299; 350/349; 350/350; 350/351
[58] Field of Search ............... 252/299, 408; 350/350, 350/351, 346, 349

[56] References Cited

U.S. PATENT DOCUMENTS

| | | | |
|---|---|---|---|
| 3,796,999 | 3/1974 | Kahn | 350/351 |
| 3,800,050 | 5/1974 | Haas et al. | 252/299 |
| 3,864,022 | 2/1975 | Moriyama et al. | 252/299 |
| 4,032,219 | 6/1977 | Constant et al. | 252/299 |
| 4,040,047 | 8/1977 | Hareng et al. | 350/351 |
| 4,059,340 | 11/1977 | Kahn et al. | 252/299 |
| 4,099,857 | 7/1978 | Hareng et al. | 350/351 |
| 4,139,273 | 2/1979 | Crossland et al. | 252/299 |

FOREIGN PATENT DOCUMENTS

2627215  1/1977  Fed. Rep. of Germany ........... 252/299

OTHER PUBLICATIONS

Tani, C., et al., Appl. Phys. Lett., vol. 33, No. 4, pp. 275-277 (1978).
White, D.L., et al., J. Appl Phys., vol. 45, No. 11, pp. 4718-4723 (1974).
Hareng, M., et al., Appl. Phys. Lett., vol. 27, No. 11, pp. 575-576 (1975).
Hareng, M., et al., Appl. Phys. Lett., vol. 25, No. 12, pp. 683-685 (1974).
Constant, J. et al., "Pleochroic Dyes with high order Parameters," presented at 6th International L. C. Conf., Kent, Ohio (1976).
Maydan, A., Proc. of The Ieee, Vol. 61, No. 7, pp. 1007-1013 (1973), Taylor, G., et al., J. Appl. Phys., Vol. 45, No.10, pp. 4330-4338 (1974), Kahn, F., Appl. Phys. Lett., Vol. 22, No. 3, pp. 111-113 (1973).

*Primary Examiner*—Teddy S. Gron
*Attorney, Agent, or Firm*—Cushman, Darby & Cushman

[57] ABSTRACT

The invention provides a liquid crystal display cell in which particles having a preferential light absorption direction, particles which may be the molecules of a dichroic pigment, are inserted in the body of a layer of a mesomorphic material in a smectic state. The write-in can be made by a thermo-optical process. The molecular orientation of the smectic material controls the particles orientation, so that the variation in the light scattering coefficient commonly used with smectic layers are replaced by variations in the absorption coefficient, easier to use and provide a better contrast.

6 Claims, 10 Drawing Figures

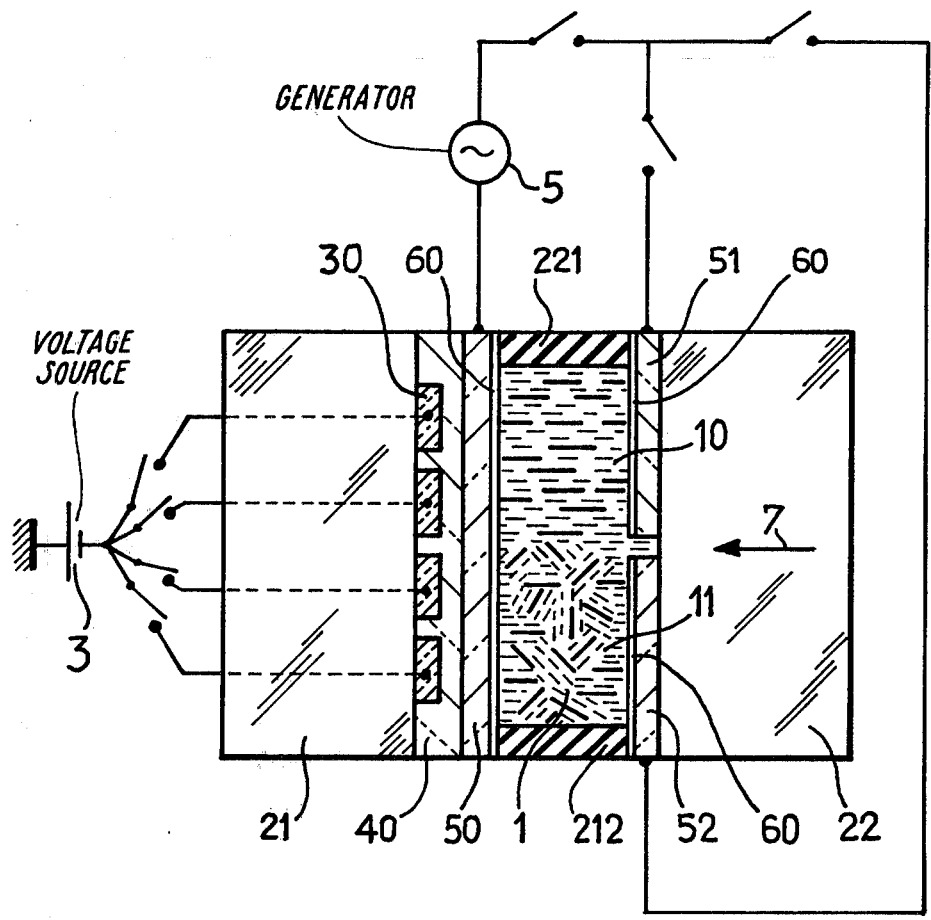

SMECTIC LIQUID CRYSTAL DISPLAY CELL

FIELD OF THE INVENTION

This invention relates to liquid crystal cells and, more particularly, to cells using a liquid crystal in the smectic phase for display purposes.

BACKGROUND OF THE INVENTION

It is already known that particles having one or two preferential elongation directions can be oriented by dispersion in a medium formed by long molecules which are themselves capable of receiving a preferential orientation. Thus, linear polarisers in the form of plates have been obtained by applying a polymer film coating to fine filiform or lamelliform metallic particles or to elongated molecules of dichroic pigments, and subsequently drawing this film. The long molecules of the polymer, which are disposed parallel to the drawing direction, impose their orientation on the dispersed material which thus absorbs any luminous vibration parallel to its elongation direction.

Mesomorphic materials also commonly called liquid crystals, which are also formed by long molecules, exhibit these same orienting properties with respect to particles dispersed within them. These long molecules arrange themselves over short distances to form microregions which, in the absence of external forces, are generally disorderly oriented relative to one another. By adequate wall treatments or by adding traces of a surfactant to the material, it is possible through the surface tension forces developed to obtain, between two supporting plates, thin layers in which these microregions are aligned in a single direction, the molecules having a uniform orientation which is generally parallel or perpendicular to the walls.

One interesting feature of the constituent molecules of mesomorphic materials is their strong polarisability which enables them to be oriented under the action of a continuous or alternating electrical or magnetic field and to entrain in their movement the particles dispersed within the material. However, whereas in the smectic-phase materials, the orientation obtained persists when the field is no longer applied, the molecules of the materials in the nematic or cholesteric phase return to their initial orientation when the field is interrupted.

These properties of the nematic or cholesteric phases have been utilised for forming optical modulators or data presentation systems which utilise the variations in absorption of a thin layer containing metallic particles or a dichroic pigment in suspension and subjected to the action of an electrical or magnetic field. In modulators of this type which use a nematic material, the quiescent state is either in disorderly orientation or is oriented in a direction parallel to the wall. In this latter case, the layers is illuminated with light polarised linearly in a direction parallel to the direction of alignment. Under the action of the field, the molecules arrange themselves into a homeotropic (i.e. perpendicular to the walls), orientation, causing the layer or those parts thereof which are subjected to the field to pass from the absorbent state to the transparent state. In modulators which use particles or pigments dispersed in a cholesteric material, the layer absorbs the natural light. Under the action of the field, the molecules right themselves perpendicularly to the walls, the helical structure is replaced by a homeotropic structure and the layer becomes transparent.

It is also known that thin layers of mesomorphic materials in the smectic phase can be used for data presentation purposes. The walls are treated to promote a uniform orientation of the molecules. The layer, which is cooled slowly from the liquid isotropic phase to the smectic phase, adopts this uniform orientation and thus appears before recording as uniformly transparent. A light beam, generally infra-red, modulated in intensity by the information to be recorded and focussed at the level of the layer, scans the layer. Its maximum intensity is calculated in such a way that, at the point of impact, the power absorbed by the layer causes this latter to pass into the liquid isotropic phase. The sudden cooling which follows results in the formation at these points of disorderly oriented and therefore strongly scattering microregions, whereas the points subjected during scanning to the minimum intensity retain their initial state and remain transparent. The information thus recorded in the form of scattering dots on a transparent background can remain intact for several weeks. It is erased by restoring the uniform transparent state by fusion, followed by controlled cooling. The image obtained may be viewed directly or projected onto a screen by means of an auxiliary light source and a strioscopic system.

In an U.S. Pat. No. 4,040,047 entitled "Erasable thermo-optic storage display of a transmitted image", HARENG et al described a data presentation system which also uses a thermo-optical recording process in a thin layer of a material in the smectic phase. In this system, a light beam of constant intensity scans the layer for successively causing the temporary fusion of each dot. The signal corresponding to the information to be recorded is applied in synchronism with the scan between two electrodes surrounding the thin layer. The various dots recrystallise into a structure which is the less disorderly, the more intense the field thus applied during cooling, and the recording is made in the form of more or less diffusing dots on a transparent background. Projection is carried out by means of a strioscopic system. Erasure is obtained by applying a voltage pulse which is considerably higher than the maximum values of the recording voltage, the field thus created restoring the layer to a uniformly oriented and therefore uniformly transparent state.

In a copending patent application filed on Dec. 13, 1975 under the Ser. No. 643,866, now abandoned, and entitled "Thermo-optic smectic liquid crystal storage display", L. THYRANT described another data presentation system which also uses a thermo-optical recording in a thin layer in the smectic phase. A treatment of the walls promotes the orientation of the layer in a first direction (for example parallel), whilst electrodes surrounding the layer enable it to be subjected to an electrical field which imposes on it a second orientation (for example homeotropic) perpendicular to the first. An initial voltage pulse imposes this second orientation on the layer and thus renders it transparent. The luminous power applied by a global projection of the image or by a modulated scanning beam enables the layer which remains in the smectic phase to be locally heated to the vicinity of the smectic phase/nematic phase transition point. During the subsequent cooling step, the layer readopts the first orientation imposed by the walls at the heated points. The connecting zones between regions of parallel and perpendicular orientation, which are microscopically disordered, are diffusing. The process only requires a relatively weak luminous intensity because the dots to be recorded do not change phase, but can only be used for recording half-tone images.

SUMMARY OF THE INVENTION

It is an object of the present invention to improve the operation and to simplify the conditions of use of cells which use a mesomorphic material in the smectic phase by dispersing in this material particles having a coefficient of absorption variable according to the orientation of the luminous vibration passing through them. By acting on the orientation of the smectic layer, the orientation of the dispersed particles is controlled which thus modulates the coefficient of absorption of the cell.

It is a further object of the invention, to retain the advantages of cells which use a smectic phase for recording images and, in particular, their property of being memory devices which it is possible to erase, whilst at the same time obviating some of their disadvantages. This object is accomplished by recording the image in the form of a variation in the coefficient of absorption rather than diffusion in such a way that its projection no longer requires the intervention of strioscopic systems, but instead is carried out by means of entirely conventional systems which are much more luminous. In addition, the light diffused by the smectic-phase layers is diffused at a relatively closed angle which limits the viewing angle at which the presentation may be directly viewed. The association of dispersed particles eliminates this problem.

It is still a further object of the invention to strongly lower the residual absorption which persists when the particles are dispersed in layers where the molecules are aligned parallel to the direction of propagation of the incident light. This result is achieved by substituting a smectic material for a nematic or cholesteric material, an important characteristic of the smectic-phase layers with respect to the dispersed particles, which distinguishes them in this respect from layers in the nematic or cholesteric phase, being the excellent quality of the alignment induced in the dispersed particles.

BRIEF DESCRIPTION OF THE DRAWINGS

The novel features which are believed to be characteristic of the invention, both as to organization and method of operation, together with further objects and advantages thereof, will be better understood from the following description considered in connection with the accompanying drawing which is, by way of example, a sectional view of a cell according to a preferred embodiment of the invention.

DESCRIPTION OF THE PREFERRED EMBODIMENT

The drawing shows a layer 1 of a mesomorphic material in the smectic phase containing dispersed particles. This layer 1 is enclosed between two plates of glass 21 and 22 which are kept at the requisite distance apart by means of two wedges 212 and 221. Parallel heating bands are arranged on the plate 21. These heating bands, which are formed by transparent resistive elements, such as 30, may be selectively or simultaneously heated by connecting them to a voltage source 3. These resistive elements are coated with a transparent insulating layer 40 which supports a continuous transparent electrode 50. Two transparent electrodes 51 and 52 are also arranged on the plate 22. A generator 5 enables a control voltage to be applied between the electrode 50 and one or other of the electrodes 51 and 52. A coating 60 lines the interface between the electrodes 50, 51 and 52 and the layer 1. The mesomorphic material forming the layer 1 may be a diphenyl, a Schiff's base, a diphenyl ester or any other mesomorphic material having a smectic phase which, in the case of the FIGURE, is selected for its sensitivity to the electrical field. The thickness of the layer may be selected between approximately ten and a few tens of micrometers.

The dispersed particles used are either filiform or lamelliform metallic particles or molecules of dichroic organic pigments. For example, particularly interesting results may be obtained by using as pigment 4-(N-pyrolidinophenyl)-azo-5-nitrothiazole corresponding to the formula:

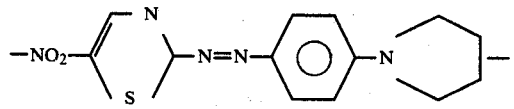

dissolved in a proportion of around 1% in 4,4'-cyano-octyldiphenyl corresponding to the formula:

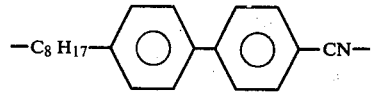

The resistive elements 30 and the electrodes 50, 51 and 52 are formed in known manner by deposits of tin or indium oxide or of a mixture of these two oxides. The insulating layer 40 is a layer of silica.

The control voltage may also be applied between the electrodes 51 and 52 which, in that case, are spaced sufficiently apart from one another to create an electrical field parallel to the plane of the layer 1. In this case, the electrode 50 may be omitted. If the cell is intended for examination by reflection, the electrode 50 for example may be formed by a reflecting metallic layer.

The coating 60 may be obtained by a deposit of silane which promotes the homeotropic orientation of the mesomorphic material. Other types of coating may be used according to the nature of the mesomorphic material and the required orientation thereof, for example a deposit of silica made at grazing incidence to promote the parallel orientation. Traces of various surfactants, of which the composition is well known in the field of liquid crystals, may also be dissolved in the mesomorphic material to promote a particular orientation of its constituent molecules relative to the walls.

The resistive elements are used for locally or globally increasing the temperature of the layer 1 either to keep the material in the smectic phase if the thermal range of existence of this phase is above the ambient temperature, or to increase the temperature in this same phase or to obtain the conversion of the smectic phase into the liquid isotropic phase. In one known technique, each band may be replaced by a row of discrete elements to form a matrix fed by a series of conductors arranged in lines and columns. By contrast, if the entire layer is to be maintained or increased in temperature, the resistive bands may be replaced by a uniform layer. In this case, it is also possible by a suitable electrical arrangement to use the layer 50 both as an electrode and as a heating element. It is also possible in accordance with the invention to use a luminous beam for heating the layer 1. In this latter case, the heating of the layer 1 is facilitated by the presence of the electrodes 50, 51 and 52 of tin or indium oxide which, by absorbing the infra-red part of the luminous radiation, transmit the heat thus released to the layer 1.

In the FIGURE, the molecules of the mesomorphic material have been symbolised by rodlets and the dispersed particles by longer, thicker rodlets. In the region 10, situated opposite the electrode 51, a voltage pulse applied to the electrode 51 has reorganised the thin smectic layer into a uniform homeotropic orientation, thus controlling the orientation of the dispersed particles which align themselves with their direction of elongation perpendicular to the walls. The part 10 of the layer is thus uniformly transparent to the light travelling parallel to the arrow 7.

By contrast, in the region 11 which has been brought into the liquid phase and suddenly cooled, the mesomorphic molecules have reorganised themselves into microregions disorderly oriented relative to one another. The dispersed particles oriented by the various microregions have all the possible orientations relative to the direction of propagation 7 of the incident light which is thus absorbed, irrespectively of its polarisation direction. The region 11 thus appears opaque both in natural light and in polarised light.

By way of a first example of application, the cell according to the invention may be used in the image reproduction system according to the above-mentioned U.S. Pat. No. 4,040,047 of HARENG et al to replace the cell provided with a thin smectic layer. In this case, the electrodes 51 and 52 are replaced by a single electrode occupying the entire surface of the plate 22. The heating electrode 30 is also a single electrode, occupies the entire surface of the plate 21 and serves to keep the thin layer of liquid crystal in the temperature range where it is in the smectic phase. In the non-recorded parts of the cell, the smectic material, which is in homeotropic orientation, orients the particles perpendicularly to the walls (which is the case in the region 10 of the accompanying FIGURE). These parts are thus transparent. The recorded parts have a structure which is closer to the completely disordered structure described by the region 11 in the accompanying FIGURE, the lower the value of the videosignal applied during cooling. They appear more absorbent, the more disordered the structure. The cell may be illuminated with natural light. The projection of the image thus recorded no longer requires a strioscopic system.

By way of a second example of application, the cell according to the invention, modified as described in the above example, may replace the smectic liquid crystal cell of the image reproduction apparatus with a memory which is the subject of the above-mentioned patent application Ser. No. 643,866 of THYRANT, now abandoned. The recorded and non-recorded dots which are distinguished by orientations perpendicular to one another of the smectic-phase material thus appear as absorbent (dots oriented parallel to the walls) or transparent (homeotropically oriented dots) with respect to light polarised linearly in the direction of the molecules in parallel orientation. There is thus no need for the image to be half-toned before recording or for a strioscopic system to be used for projecting the recorded image.

What we claim is:

1. A liquid crystal cell comprising:
   two plates, at least one of them being transparent;
   a layer of a material having a smectic mesomorphic state; said layer being inserted between said plates and containing in dispersion particles exhibiting a preferential light absorption direction;
   means for providing heat pulses to at least a selected part of said layer;
   said layer being in said smectic state at least in the absence of said heat pulses and the molecular orientation of said material in said smectic state controlling the orientation of said particles.

2. A cell as claimed in claim 1, wherein said particles are the molecules of a dichroic pigment.

3. A cell as claimed in claim 1, which further comprises a treatment of at least one surface arranged on at least one said plate in contact with said layer for promoting a preferential molecular orientation of said material.

4. A cell as claimed in claim 1, which further comprises a substance dissolved in said material for promoting a preferential molecular orientation thereof.

5. A cell as claimed in claim 1, which further comprises at least two electrodes for subjecting said layer to an electrical field.

6. A cell as claimed in claim 5, wherein each of said plates supports at least one of said electrodes, the electrode supported by said transparent plate being transparent.

* * * * *